(12) United States Patent
Kumetani

(10) Patent No.: US 11,113,018 B2
(45) Date of Patent: Sep. 7, 2021

(54) CONTENT DISPLAY SYSTEM AND DISPLAY DEVICE

(71) Applicant: SHARP KABUSHIKI KAISHA, Sakai (JP)

(72) Inventor: Kohji Kumetani, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 251 days.

(21) Appl. No.: 16/449,234

(22) Filed: Jun. 21, 2019

(65) Prior Publication Data
US 2020/0012470 A1    Jan. 9, 2020

(30) Foreign Application Priority Data

Jul. 9, 2018 (JP) .............................. JP2018-129714

(51) Int. Cl.
| | | |
|---|---|---|
| *G06F 3/00* | (2006.01) | |
| *G06F 13/00* | (2006.01) | |
| *H04N 5/445* | (2011.01) | |
| *G06F 3/14* | (2006.01) | |
| *G06Q 30/02* | (2012.01) | |
| *H04L 29/06* | (2006.01) | |
| *G06F 3/16* | (2006.01) | |

(52) U.S. Cl.
CPC ................ *G06F 3/14* (2013.01); *G06F 3/167* (2013.01); *G06Q 30/0257* (2013.01); *H04L 63/0861* (2013.01)

(58) Field of Classification Search
CPC ....... G06F 3/14; G06F 3/167; H04L 63/0861; G06Q 30/0257
See application file for complete search history.

(56) References Cited

U.S. PATENT DOCUMENTS

| | | | |
|---|---|---|---|
| 2014/0195249 A1* | 7/2014 | Chung | G10L 21/06 704/275 |
| 2016/0217783 A1* | 7/2016 | Konuma | G10L 15/1822 |
| 2017/0064400 A1* | 3/2017 | Riegel | H04N 21/2743 |
| 2018/0047386 A1* | 2/2018 | Garner | G10L 15/08 |
| 2019/0066670 A1* | 2/2019 | White | G10L 15/28 |

FOREIGN PATENT DOCUMENTS

JP    2013-152277 A    8/2013

* cited by examiner

*Primary Examiner* — Kyu Chae
(74) *Attorney, Agent, or Firm* — ScienBiziP, P.C.

(57) ABSTRACT

The content display system of the present invention includes: a first controller which displays content on a display; a second controller which receives a voice; a third controller which generates a command corresponding to the voice received by the second controller, and determines whether the generated command is a change command to change first content being displayed on the display; and a fourth controller which distributes, to the first controller, second content corresponding to the change command when the third controller determines that the command is the change command. The first controller changes a material being displayed on the display from the first content to the second content distributed by the fourth controller.

5 Claims, 12 Drawing Sheets

| COMMAND INFORMATION DATABASE ||
|---|---|
| SPEAKER ID | COMMAND |
| A001 | "REPRODUCE CONTENT A" |
| A002 | "CHANGE TO CONTENT B" |
| B003 | "DISPLAY CONTENT MENU" |
| B004 | "ENTER PASSWORD" |
| C005 | "SEARCH FOR KEYWORD" |
| ... | ... |

CONTENT DISPLAY SYSTEM AND DISPLAY DEVICE

BACKGROUND OF THE INVENTION

Field of the Invention

The present invention relates to a content display system such as a digital signage system, and to a display device.

Description of the Background Art

Digital signage for displaying content such as advertisements on a display (a display device) for an unspecified large number of people in public facilities, etc., is known (see, for example, Japanese Unexamined. Patent Application Publication No. 2013-152277).

Generally, the digital signage is configured as a system in which a manager of a digital signage system sets content to be distributed, and the content that has been set is distributed from a management server to display devices serving as respective clients. The manager performs an operation of determining the content in the management server, or changing the content being displayed in response to a request from a client of the advertisement.

Here, in the case of a digital signage system in which a management server manages a large number of display devices, the respective display devices are disposed in many different places. In such a case, since the situations (the weather, a path of movement and attribute of a user who uses the facilities, etc.) of the places where the respective display device are installed vary, the content is preferably determined or changed according to the place of installation. In the above respect, since a conventional system is configured such that the content is determined and changed by the manager in the management server, it is difficult to easily change the content being displayed, for example, according to the location.

An object of the present invention is to provide a content display system, which displays content and is capable of easily changing the content being displayed, and a display device.

SUMMARY OF THE INVENTION

A content display system according to one aspect of the present invention includes: a content reproduction portion which displays content on a display portion; a voice receiving portion which receives a voice; a command generation portion which generates a command corresponding to the voice received by the voice receiving portion; a command determiner which determines whether the command generated by the command generation portion is a change command to change first content being displayed on the display portion; and a content distribution portion which distributes, to the content reproduction portion, second content corresponding to the change command when the command determiner determines that the command is the change command. The content reproduction portion changes a material being displayed on the display portion from the first content to the second content distributed by the content distribution portion.

A display device according to another aspect of the present invention displays content, and includes a content reproduction portion which displays content on the basis of a command corresponding to a voice. Here, when the command corresponding to the voice is a change command to change first content being displayed on the display device, the content reproduction portion changes a material being displayed on the display device from the first content to the second content.

According to the present invention, in the content display system which displays content, it becomes possible to easily change the content being displayed.

BRIEF DESCRIPTION OF THE DRAWINGS

FIG. 4 is a diagram illustrating an example of command information database in the content display system according to the embodiment of the present invention;

DESCRIPTION OF THE PREFERRED EMBODIMENTS

Hereinafter, embodiments of the present invention will be described with reference to the accompanying drawings. The embodiment described below is an example embodying the present invention, and is not intended to limit the technical scope of the present invention.

A content display system according to the present invention is applied to a digital signage system that displays content such as an advertisement on a display device (a display) in various places such as a store, a station, a street, and an office. The content includes a still image, a moving image, music, and the like.

Figure 1:
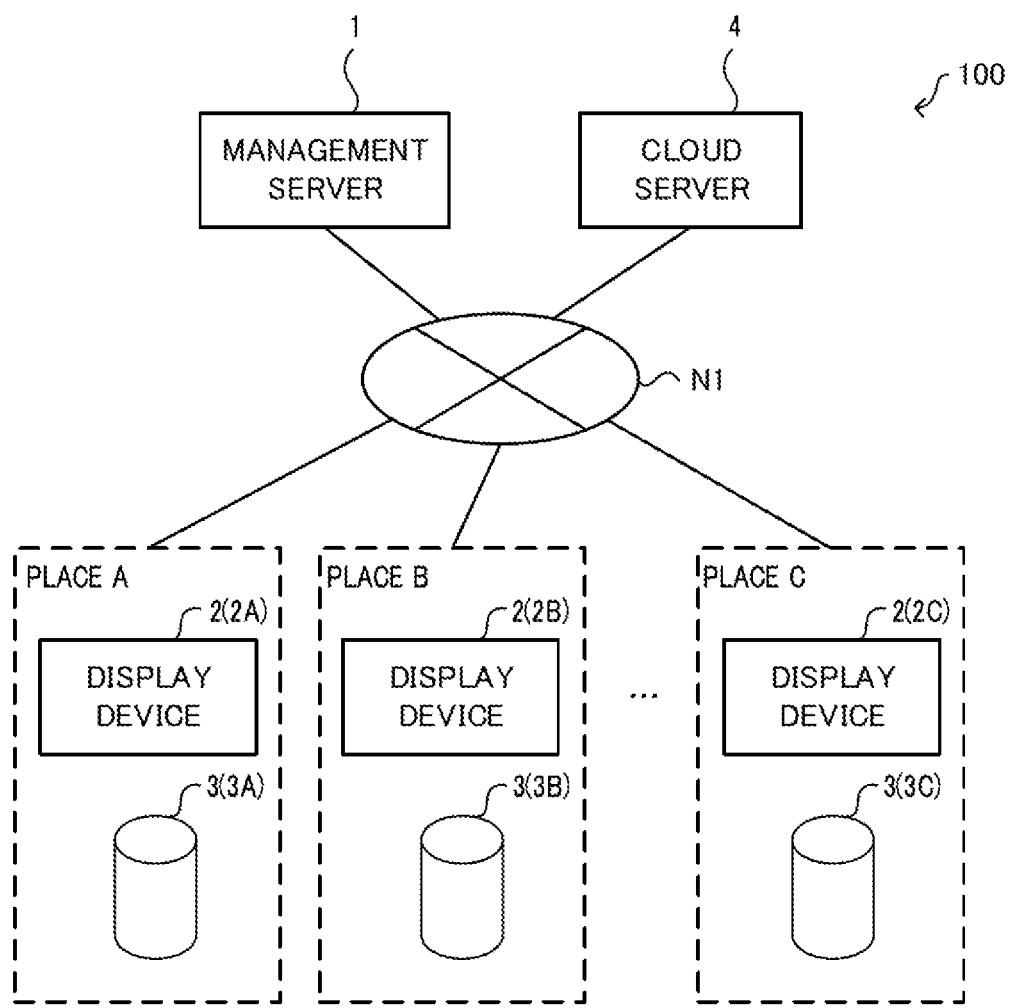
FIG. 1 is a diagram illustrating a schematic structure of a content display system according to an embodiment of the present invention.

FIG. 1 is a diagram illustrating a schematic structure of a content display system according to an embodiment of the present invention. A content display system 100 includes a management server 1, a plurality of display devices 2, a plurality of speaker devices 3 (for example, AI speakers, smart speakers, etc.), and a cloud server 4. The management server 1, the display devices 2, the speaker devices 3, and the cloud server 4 are connected to each another via a network N1. The network N1 is a communication network such as the Internet, a LAN, a WAN, or a public telephone line. The speaker devices 3 are each disposed near one of the display devices 2 in association with the display device 2. Each of the display devices 2 and each of the speaker devices 3 are disposed at a place where the content is to be displayed (reproduced). For example, a display device 2A and a speaker device 3A associated with the display device 2A are disposed at place A, a display device 2B and a speaker device 3B associated with the display device 2B are disposed at place B, and a display device 2C and a speaker device 3C associated with the display device 2C are disposed at place C. The management server 1 is disposed, for example, in a business entity that collectively manages the plurality of display devices 2, to manage and control the plurality of display devices 2. Only one management server 1 may be provided, or the management server 1 may be provided in plurality. Further, the number of display devices 2 managed by a single management server 1 is not limited. The cloud server 4 is constructed from, for example, a plurality of data servers (virtual servers).

The specific configuration of the content display system 100 will be described below. In the following explanation, the display devices 2A, 2B, and 2C are each referred to as the display device 2 when the display devices 2A, 2B, and 2C need not be distinguished from each other, and the speaker devices 3A, 3B, and 3C are each referred to as the speaker device 3 when the speaker devices 3A, 3B, and 3C need not be distinguished from each other. Also, the cloud server 4 is described as a single virtual server. Note that the cloud server 4 may be replaced by a single physical server.

Management Server 1

Figure 2:
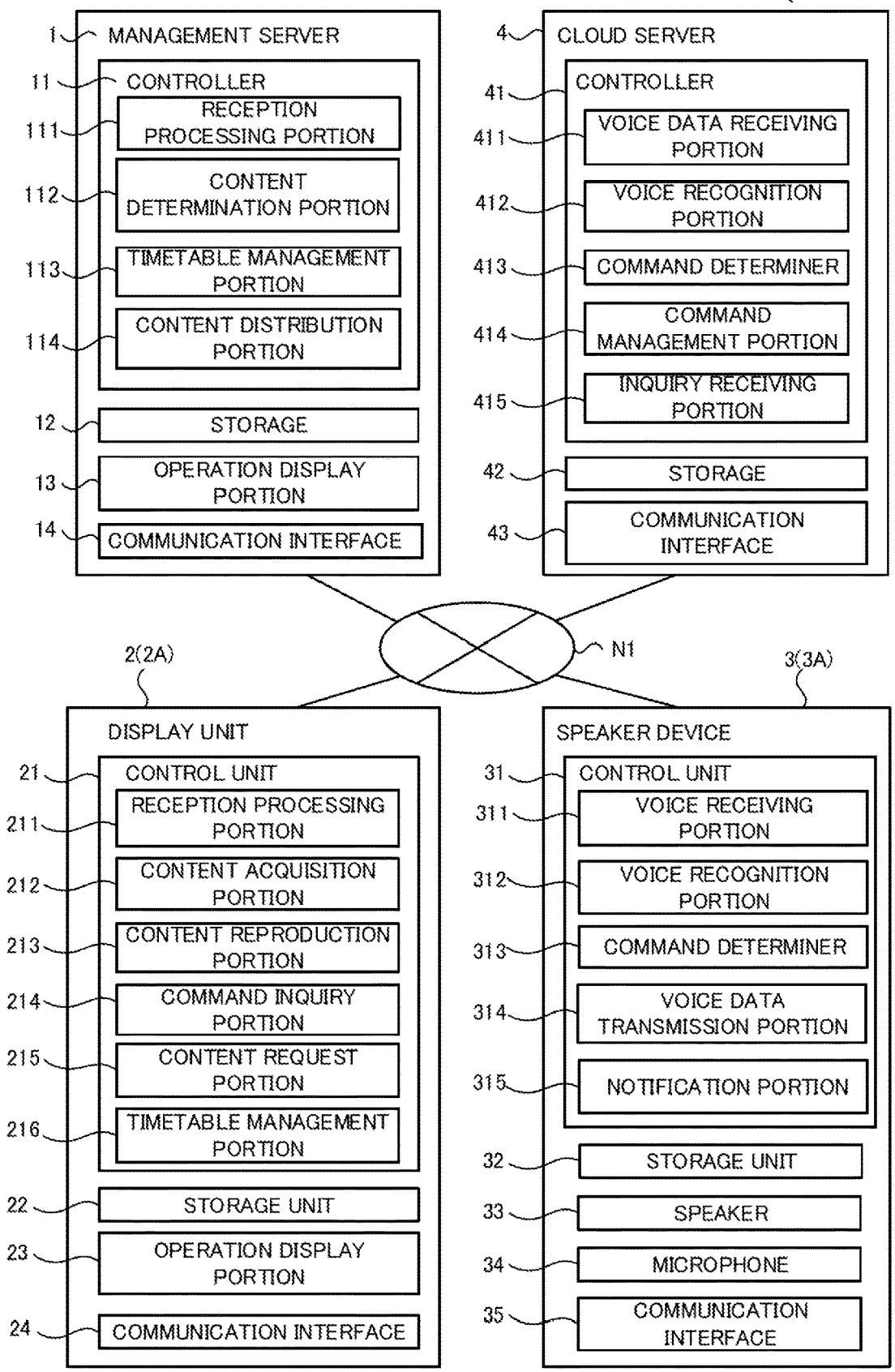
FIG. 2 is a functional block diagram illustrating the structure of the content display system according to the embodiment of the present invention.

As illustrated in FIG. 2, the management server 1 includes a controller 11, storage 12, an operation display portion 13, a communication interface 14, and the like. The management server 1 may be an information processor such as a personal computer. The operation display portion 13 is an example of a display portion of the present invention.

The communication interface 14 is a communication interface used to connect the management server 1 to the network N1 wirelessly or by wire and execute data communication conforming to a predetermined communication protocol with another device (for example, the display device 2) via the network N1.

The operation display portion 13 is a user interface including a display portion such as a liquid crystal display or an organic EL display that displays various kinds of information, and an operation portion such as a mouse, a keyboard, or a touch panel that receives input of operation.

The storage 12 is nonvolatile storage such as an HDD, an SSD, or a flash memory storing various kinds of information. For example, the storage 12 stores a control program executed by the controller 11. For example, the content, the control program, and the like, are permanently recorded on a computer-readable recording medium such as a CD or a DVD, are read by a reader (not illustrated) such as a CD drive or a DVD drive that is electrically connected to the management server 1, and are stored in the storage 12.

In addition, signage software is installed in the storage 12 as the control program. When activation of the signage software is instructed as a result of the manager's operation in a state in which the management server 1 is launched, the controller 11 reads the signage software from the storage 12 and executes the signage software. Consequently, the signage software is activated in the management server 1.

Figure 3:
FIG. 3 is a diagram illustrating an example of a timetable in the content display system according to the embodiment of the present invention.

Further, the storage 12 stores content to be distributed to the display device 2, and a timetable defining a reproduction schedule for display (reproduction) of the content. The content includes a still image, a moving image, music, and the like. The content may be downloaded to the management server 1 via the network N1 on the basis of the operation of the manager who operates the management server 1, or may be transferred to the management server 1 from a recording medium on which the content is recorded. The manager creates a timetable T1 corresponding to the content. FIG. 3 illustrates an example of the timetable T1. In the timetable T1 illustrated in FIG. 3, a reproduction schedule of powering on the display device 2A and starting reproduction of content A at "9:00", stopping the reproduction of content A and starting reproduction of content B at "17:00", and stopping the reproduction of content B and powering off the display device 2A at "21:00" is set. The storage 12 stores the content and the timetable T1 for each of the display devices 2.

The controller 11 includes control devices such as a CPU, a ROM, and a RAM. The CPU is a processor that executes various types of arithmetic processing. The ROM is nonvolatile storage in which control programs such as a BIOS and an OS for causing the CPU to execute various types of processing are stored in advance. The RAM is volatile or nonvolatile storage storing various kinds of information, and is used as a temporary storage memory (work area) for various types of processing executed by the CPU. Further, the controller 11 controls the management server 1 by causing the CPU to execute various control programs stored in advance in the ROM or the storage 12.

Specifically, the controller 11 includes various processing portions such as a reception processing portion 111, a content determination portion 112, a timetable management portion 113, and a content distribution portion 114. The content distribution portion 114 is an example of a content distribution portion of the present invention. The controller 11 functions as the various processing portions described above by the CPU executing various types of processing according to the control program. Also, a part of or all of the processing portions included in the controller 11 may be configured from an electronic circuit. Note that the control program may be a program for causing a plurality of processors to function as the various processing portions described above.

The reception processing portion 111 receives operation information corresponding to the operation performed by the manager on the operation display portion 13. Further, the reception processing portion 111 receives, from the display device 2, various kinds of information described later, such as change information related to the timetable T1 (FIG. 3), a request for distribution of content, and a request for distribution of a content menu.

The content determination portion 112 determines the content to be distributed (transmitted) to the display device 2. Specifically, the content determination portion 112 determines the content on the basis of an instruction given by the manager, a request from the display device 2, and the like.

The timetable management portion 113 creates the timetable T1 (FIG. 3) on the basis of the content determined by the content determination portion 112. The timetable management portion 113 stores the created timetable T1 in the storage 12. Further, the timetable management portion 113 changes the timetable T1 on the basis of the request from the display device 2. For example, the timetable management portion 113 changes the timetable T1 when the content has been changed. Further, for example, when the timetable T1 is changed in the display device 2, the timetable management portion 113 receives the changed timetable T1 from the display device 2, and stores the changed timetable in the storage 12 (updates the timetable).

The content distribution portion 114 transmits, to the display device 2, the content determined by the content determination portion 112, and the timetable T1 created or changed by the timetable management portion 113. Also, when the content distribution portion 114 receives a distribution request for a content menu from the display device 2, the content distribution portion 114 transmits the content menu to the display device 2.

Speaker Device 3

As illustrated in FIG. 2, the speaker device 3 includes a controller 31, storage 32, a speaker 33, a microphone 34, a communication interface 35, and the like. The speaker device 3 may be, for example, a device such as an AI speaker or a smart speaker. The speaker device 3 is disposed near the display device 2, and acquires, through the microphone 34, a voice of a user who uses the display device 2, or outputs (issues) a voice or sound toward the user from the speaker 33. The user includes an operator who is authorized to operate the display device 2, and a viewer who views the content displayed on the display device 2.

The communication interface 35 is a communication interface used to connect the speaker device 3 to the network N1 wirelessly or by wire and execute data communication conforming to a predetermined communication protocol with another device (for example, the cloud server 4) via the network N1.

The storage 32 is nonvolatile storage such as a flash memory storing various kinds of information. For example, the storage 32 stores a control program executed by the controller 31. For example, the control program is distributed from the management server 1 or the cloud server 4 and recorded. Alternatively, the control program may be recorded from a recording medium such as a USB (registered trademark) memory.

The controller 31 includes control devices such as a CPU, a ROM, and a RAM. The CPU is a processor that executes various types of arithmetic processing. The ROM is nonvolatile storage in which the control programs such as a BIOS and an OS for causing the CPU to execute various types of processing are stored in advance. The RAM is volatile or nonvolatile storage storing various kinds of information, and is used as a temporary storage memory (work area) for various types of processing executed by the CPU. Further, the controller 31 controls the speaker device 3 by causing the CPU to execute various control programs stored in advance in the ROM or the storage 32.

Specifically, the controller 31 includes various processing portions such as a voice receiving portion 311, a voice recognition portion 312, a command determiner 313, a voice data transmission portion 314, and a notification portion 315. The voice receiving portion 311 is an example of a voice receiving portion of the present invention. The controller 31 functions as the various processing portions described above by the CPU executing various types of processing according to the control program. Also, a part of or all of the processing portions included in the controller 31 may be configured from an electronic circuit. Note that the control program may be a program for causing a plurality of processors to function as the various processing portions described above.

The voice receiving portion 311 receives a voice uttered by the user (operator or viewer) who uses the display device 2. The user utters a voice corresponding to each command such as an activation command (wakeup command) instructing activation of the speaker device 3, a reproduction command instructing reproduction of the content, a change command instructing change of the content being reproduced, a menu command instructing display of the content menu, and a search command instructing a search for a desired keyword.

The voice recognition portion 312 executes voice recognition processing on the voice received by the voice receiving portion 311. For example, the voice recognition portion 312 converts voice data corresponding to the voice into text data. A well-known technique can be applied to the voice recognition processing.

The command determiner 313 determines, on the basis of the text data, whether the voice received by the voice receiving portion 311 corresponds to the activation command.

When the voice corresponds to the activation command, the controller 31 acquires voice data corresponding to the voice received by the voice receiving portion 311 after issuance of the activation command. For example, when the user utters a voice corresponding to a predetermined command, the controller 31 acquires voice data corresponding to the voice. Also, for example, when an operator who is authorized to operate the display device 2 speaks a predetermined password indicating authentication information, the controller 31 acquires the password. As described above, the controller 31 starts acquiring voice data when the activation command is received. In other words, the speaker device 3 is kept in a sleep mode until the activation command is received, and shifts to a normal mode when the activation command is received.

The voice data transmission portion 314 transmits the voice data acquired in the normal mode to the cloud server 4. The cloud server 4 determines whether a voice corresponding to the voice data received from the speaker device 3 is an appropriate command (i.e., whether the voice is "appropriate" or an "error" (inappropriate)), and notifies the speaker device 3 of the result of determination.

The notification portion 315 outputs (issues) an error message from the speaker 33 when the result of determination received from the cloud server 4 indicates an "error".

Cloud Server 4

As illustrated in FIG. 2, the cloud server 4 includes a controller 41, storage 42, a communication interface 43, and the like.

The communication interface 43 is a communication interface used to connect the cloud server 4 to the network N1 wirelessly or by wire and execute data communication conforming to a predetermined communication protocol with other devices (for example, the speaker device 3 and the display device 2) via the network N1.

The storage 42 is nonvolatile storage such as a flash memory storing various kinds of information. For example, the storage 42 stores a control program executed by the controller 41. For example, the control program is permanently recorded on a computer-readable recording medium such as a CD or a DVD, is read by a reader (not illustrated) such as a CD drive or a DVD drive that is electrically connected to the cloud server 4, and is stored in the storage 42.

The storage 42 also stores commands corresponding to voice data received from the speaker device 3. FIG. 4 is a diagram illustrating an example of a command information database DB1. In which information on the command is registered. In the command information database DB1, identification information (speaker ID) of the speaker device 3, which has transmitted the voice data, and the specifics of the command corresponding to the voice data are registered. The command information database DB1 may be a queue database having a queue structure. Also, the command information database DB1 may be provided individually to correspond to each of the speaker devices 3.

The controller 41 includes control devices such as a CPU, a ROM, and a RAM. The CPU is a processor that executes various types of arithmetic processing. The ROM is nonvolatile storage in which the control programs such as a BIOS and an OS for causing the CPU to execute various types of processing are stored in advance. The RAM is volatile or nonvolatile storage storing various kinds of information, and is used as a temporary storage memory (work area) for various types of processing executed by the CPU. Further, the controller 41 controls the cloud server 4 by causing the CPU to execute various control programs stored in advance in the ROM or the storage 42.

Specifically, the controller 41 includes various processing portions such as a voice data receiving portion 411, a voice recognition portion 412, a command determiner 413, a command management portion 414, and an inquiry receiving portion 415. The command management portion 414 is an example of a command generation portion and a command management portion of the present invention. The controller 41 functions as the various processing portions described above by the CPU executing various types of processing according to the control program. Also, a part of or all of the processing portions included in the controller 41 may be configured from an electronic circuit. Note that the control program may be a program for causing a plurality of processors to function as the various processing portions described above.

The voice data receiving portion 411 receives the voice data transmitted from the speaker device 3 when the speaker device 3 is in the normal mode. Note that when the speaker device 3 is in the sleep mode, the voice data is not transmitted to the cloud server 4, and unnecessary data communication can therefore be suppressed.

The voice recognition portion 412 executes voice recognition processing on the voice data received by the voice receiving portion 411. For example, the voice recognition portion 412 converts the voice data into text data.

The command determiner 413 determines whether a voice corresponding to the voice data is an appropriate command (i.e., whether the voice is "appropriate" or an "error" (inappropriate)), on the basis of the text data obtained by conversion by the voice recognition portion 412. For example, when the text data is "reproduce content A", what the text data signifies is an instruction to reproduce content A. Thus, the command determiner 413 determines that, the voice corresponding to the voice data is an appropriate command (reproduction command). Also, when the text data is "change to content B", for example, what the text data signifies is an instruction to change the content being displayed to content B different from the displayed content. Thus, the command determiner 413 determines that the voice corresponding to the voice data is an appropriate command (change command). Furthermore, when the text data is "display a content menu", for example, what the text data signifies is an instruction to display the content menu.

Thus, the command determiner 413 determines that the voice corresponding to the voice data is an appropriate command (menu command). If the text data does not signify a predetermined instruction, the command determiner 413 determines occurrence of an "error", assuming that, the voice corresponding to the voice data is not an appropriate command. The command determiner 413 notifies the speaker device 3 of the result of determination.

Also, the command determiner 413 determines whether the user has the authority over operation (i.e., authentication process), on the basis of the text data corresponding to the password and converted by the voice recognition portion 412.

The command management portion 414 generates a command according to a predetermined format, on the basis of the text data determined as representing an appropriate command by the command determiner 413. The command management portion 414 registers the generated command in the command information database DB1 (FIG. 4) The command management portion 414 generates a command directing "reproduction of content A" for the text data "reproduce content A", a command directing "change to content B" for the text data "change to content B", and a command directing "display of a content menu" for the text data "display a content menu".

Further, when it is determined, by the authentication process, that the user has the authority over operation, the command management portion 414 sets a password on the generated command. In other words, when the voice received by the voice receiving portion 311 of the speaker device 3 includes authentication information (a password) for authenticating the user (operator), the command management portion 414 adds the authentication information to the command generated corresponding to the voice.

The inquiry receiving portion 415 receives, from the display device 2, inquiry information inquiring whether the command is registered in the command information database DB1. The display device 2 executes polling processing of transmitting inquiry information to the cloud server 4 at regular intervals and inquiring whether the command is registered in the command information database DB1.

Display Device 2

As illustrated in FIG. 2, the display device 2 includes a controller 21, storage 22, an operation display portion 23, a communication interface 24, and the like. The display device 2 is display equipment applied to digital signage.

The communication interface 24 is a communication interface used to connect the display device 2 to the network N1 wirelessly or by wire and execute data communication conforming to a predetermined communication protocol with other devices (for example, the management server 1 and the cloud server 4) via the network N1.

The operation display portion 23 is a user interface including a display portion such as a liquid crystal display or an organic EL display that displays various kinds of information, and an operation portion such as a mouse, a keyboard, or a touch panel that receives input of operation. The display portion of the operation display portion 23 displays the content.

The storage 22 is nonvolatile storage such as an HDD, an SSD, or a flash memory storing various kinds of information. For example, the storage 22 stores a control program executed by the controller 21, content, and the like. For example, the content is distributed from the management server 1. For example, the control program is permanently recorded on a computer-readable recording medium such as a CD or a DVD, is read by a reader (not illustrated) such as a CD drive or a DVD drive that is electrically connected to the display device 2, and is stored in the storage 22. In addition, signage software is installed in the storage 22 as the control program. When activation of the signage software is instructed as a result of the operation of the user (operator) in a state in which the display device 2 is activated, the controller 21 reads the signage software from the storage 22 and executes the signage software. Consequently, the signage software is activated in the display device 2.

Further, the storage 22 stores content to be displayed (reproduced) on the display device 2, and a timetable for display of the content. The content includes content distributed from the management server 1, content downloaded to the display device 2 via the network N1 on the basis of the user's operation, content input from a recording medium on which the content is recorded, etc.

The controller 21 includes control devices such as a CPU, a ROM, and a RAM. The CPU is a processor that executes various types of arithmetic processing. The ROM is nonvolatile storage in which the control programs such as a BIOS and an OS for causing the CPU to execute various types of processing are stored in advance. The RAM is volatile or nonvolatile storage storing various kinds of information, and is used as a temporary storage memory (work area) for various types of processing executed by the CPU. Further, the controller 21 controls the display device 2 by causing the CPU to execute various control programs stored in advance in the ROM or the storage 22.

Specifically, the controller 21 includes various processing portions such as a reception processing portion 211, a content acquisition portion 212, a content reproduction portion 213, a command inquiry portion 214, a content request portion 215, and a timetable management portion 216. The content reproduction portion 213 is an example of a content reproduction portion of the present invention, the content request portion 215 is an example of a content request portion of the present invention, and the timetable management portion 216 is an example of a timetable management portion of the present invention. The controller 21 functions as the various processing portions described above by the CPU executing various types of processing according to the control program. Also, a part of or all of the processing portions included in the controller 21 may be configured from an electronic circuit. Note that the control program may be a program for causing a plurality of processors to function as the various processing portions described above.

The reception processing portion 211 receives operation information corresponding to the operation performed by the user (operator or viewer) or the operation display portion 13. For example, when the operator performs an operation of changing the timetable T1, the reception processing portion 211 receives the operation information in question.

The content acquisition portion 212 acquires content data distributed from the management server 1, and the timetable T1 corresponding to the content data. The content acquisition portion 212 stores the acquired content data and timetable T1 in the storage 22.

The content reproduction portion 213 displays (reproduces) the content acquired by the content acquisition portion 212 on a display portion of the operation display portion 23 in accordance with the above-mentioned timetable T1. For example, the content reproduction portion 213 reproduces predetermined content on the basis of the reproduction command, changes the material being displayed to content reflecting a change on the basis of the change command, displays the content menu on the basis of the menu command, and displays search results on the basis of the search command.

The command inquiry portion 214 transmits inquiry information inquiring whether the command is registered in the command information database DB1. (FIG. 4) in the cloud server 4. For example, the command inquiry portion 214 executes polling processing of transmitting inquiry information to the cloud server 4 at regular intervals and inquiring whether the command is registered in the command information database DB1. The command inquiry portion 214 determines the registered command (reproduction command, change command, menu command, search command, etc.), on the basis of a result obtained in response to the inquiry. The command inquiry portion 214 is an example of a command determiner and an inquiry portion of the present invention.

The content request portion 215 makes various requests regarding the content, of the management server 1 on the basis of the command registered in the command information database DB1. For example, when a command (reproduction command) directing "reproduction of content A" is registered in the command information database DB1, the content request portion 215 requests the management server 1 to distribute content A and the timetable T1. Also, for example, when a command (change command) directing "reproduction of content B" is registered in the command information database DB1, the content request portion 215 requests the management server 1 to distribute content B. For example, when a command (menu command) directing "display of a content menu" is registered in the command information database DB1, the content request portion 215 requests the management server 1 to distribute the content menu. Note that when a command (search command) directing "search for a keyword" is registered in the command information database DB1, the content request portion 215 may request the management server 1 to distribute a result of the keyword search, or the display device 2 itself may execute the keyword search process.

The timetable management portion 216 manages the timetable T1 distributed from the management server 1. Also, for example, when content data of content B is distributed from the management server 1 on the basis of the change command described above, the timetable management portion 216 changes the timetable T1 on the basis of content B (see FIG. 3). When the timetable T1 is changed, the timetable management portion 216 transmits the timetable reflecting the change, i.e., a timetable T2, to the management server 1.

Figure 5:
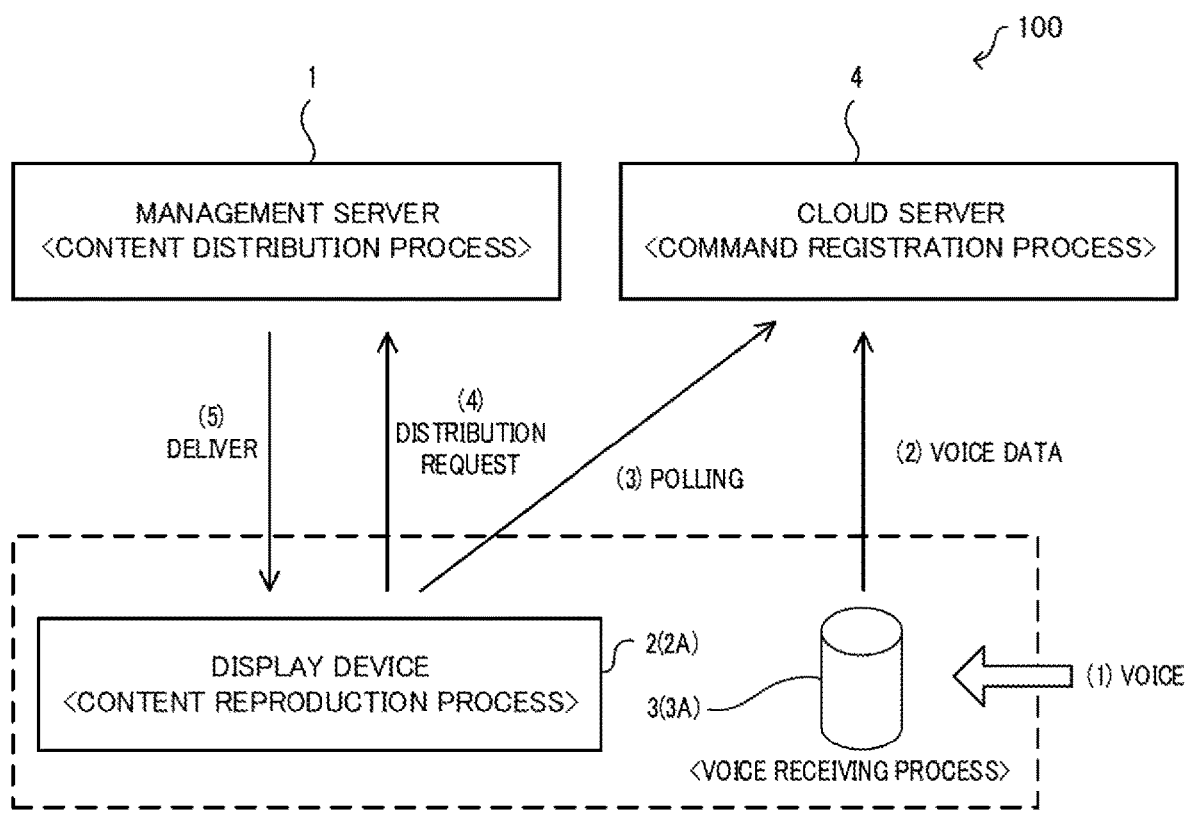
FIG. 5 is a diagram schematically illustrating an example of steps of a process carried out in the content display system according to the embodiment of the present invention.

As illustrated in FIG. 5, for example, the content display system 100 according to the present invention executes, in the order described below, a voice receiving process of receiving the user's voice by the speaker device 3, a command registration process of registering a command by the cloud server 4 on the basis of the voice, a content distribution process of distributing, on the basis of the command, content to the display device 2 by the management server 1, and a content reproduction process of displaying (reproducing) the content by the display device 2. An example of steps of each of the processes will be described below.

Voice Receiving Process

Figure 6:
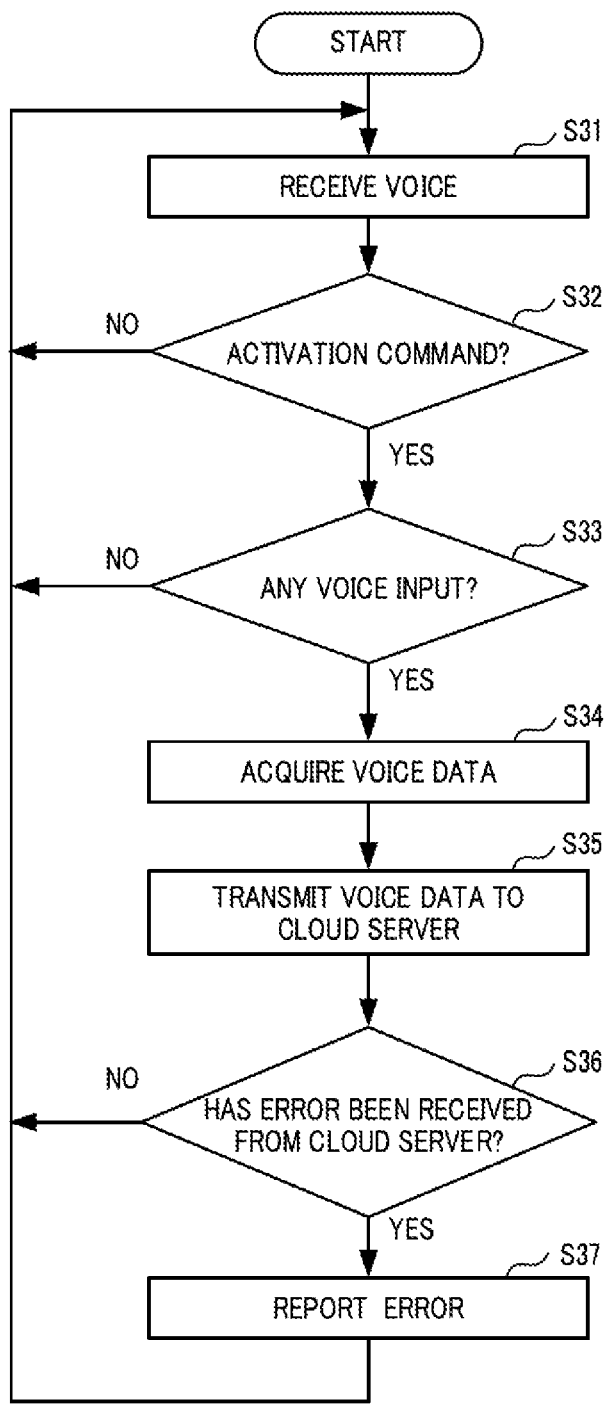
FIG. 6 is a flowchart for explaining an example of steps of a voice receiving process in the content display system according to the embodiment of the present invention.

Hereinafter, with reference to FIG. 6, an example of the steps of the voice receiving process executed by the controller 31 of the speaker device 3 will be described.

In step S31, the controller 31 (voice receiving portion 311) receives a voice uttered by the user. In step S32, the controller 31 (command determiner 313) determines whether the voice received by the voice receiving portion 311 corresponds to an activation command. If the voice corresponds to the activation command (S32: YES), the process proceeds to step S33. If the voice does not correspond to the activation command (S32: NO), the process returns to step S31.

When the controller 31 (voice receiving portion 311) receives a voice after the activation command is acquired and the speaker device 3 is shifted to the normal mode (S33: YES), in step S34, the controller 31 acquires voice data corresponding to the voice received by the voice receiving portion 311. In step S35, the voice data transmission portion 314 transmits the acquired voice data to the cloud server 4.

The cloud server 4 determines whether the voice corresponding to the voice data received from the speaker device 3 is an appropriate command (i.e., whether the voice is "appropriate" or an "error" (inappropriate)), and notifies the speaker device 3 of the result of determination.

In step S36, the controller 31 determines whether an "error" has been received from the cloud server 4. When an "error" is received from the cloud server 4 (S36: YES), the process proceeds to step S37, but when no "error" is received from the cloud server 4 (i.e., when a result "appropriate" is received), the process returns to step S31.

In step S37, the controller 31 (notification portion 315) outputs (issues) an error message from the speaker 33. The speaker device 3 repeats the above process.

Command Registration Process

Figure 7:
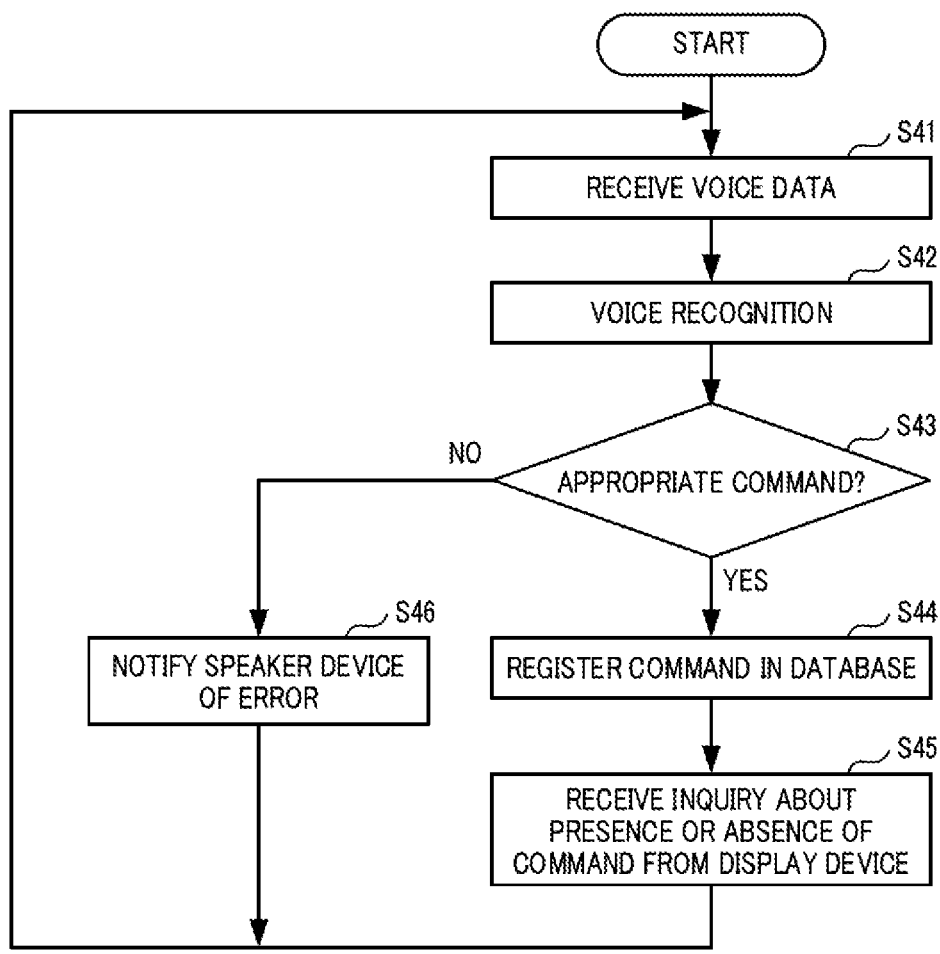
FIG. 7 is a flowchart for explaining an example of steps of a command registration process in the content display system according to the embodiment of the present invention.

Hereinafter, with reference to FIG. 7, an example of the steps of the command registration process executed by the controller 41 of the cloud server 4 will be described.

In step S41, the controller 41 (voice data receiving portion 411) receives the voice data transmitted from the speaker device 3. In step S42, the controller 41 (voice recognition portion 412) executes voice recognition processing on the voice data received by the voice receiving portion 411.

In step S43, the controller 41 (command determiner 413) determines whether a voice corresponding to the voice data is an appropriate command (i.e., whether the voice is "appropriate" or an "error" (inappropriate)), on the basis of the text data obtained by conversion by the voice recognition portion 412.

When the voice corresponding to the voice data is not an appropriate command (S43: NO), the command determiner 413 notifies the speaker device 3 of an "error" (S46).

If the voice corresponding to the voice data is an appropriate command (S43: YES), the controller 41 (command management portion 414) generates a command according to a predetermined format on the basis of the text data, and registers the generated command in the information database DB1 WIG. 4) (S44).

In step S45, the controller 41 (inquiry receiving portion 415) receives, from the display device 2, inquiry information inquiring whether the command is registered in the command information database DB1. The cloud server 4 repeats the above process.

Content Distribution Process

Figure 8:
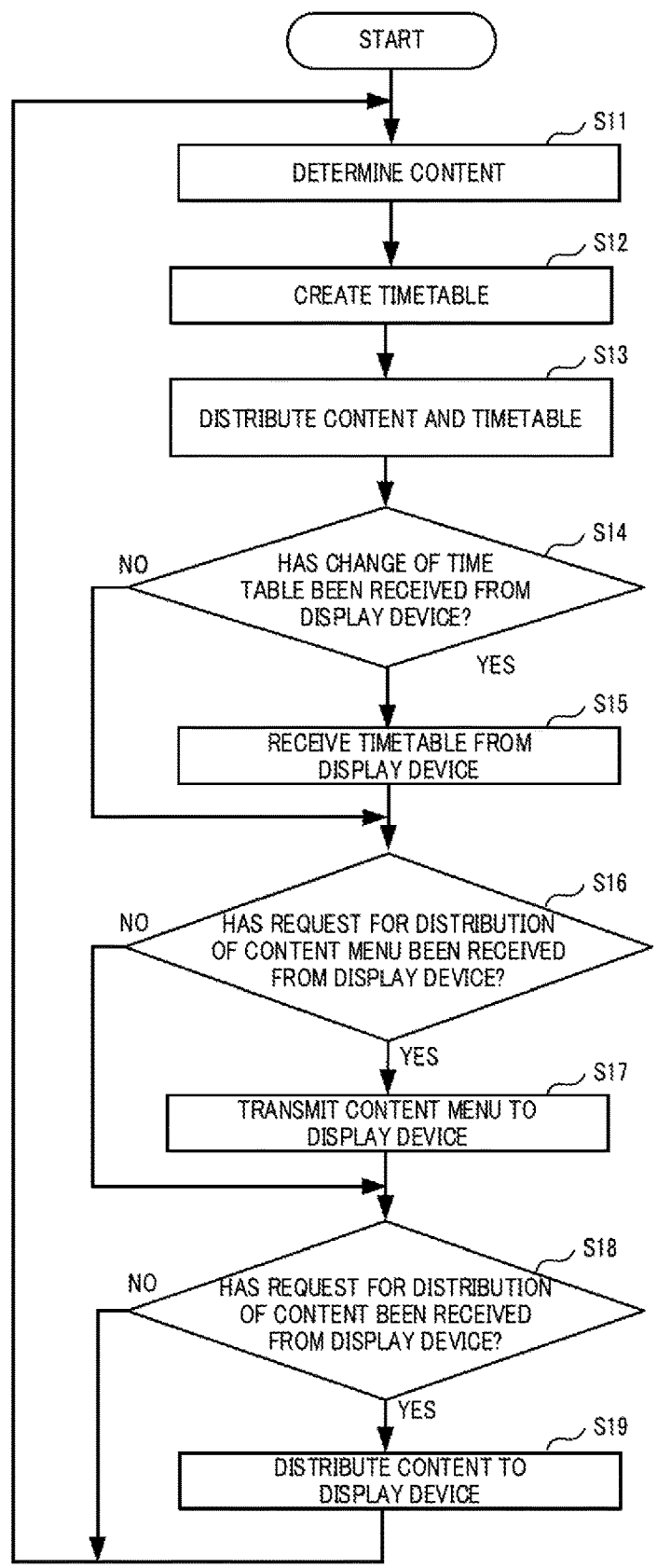
FIG. 8 is a flowchart for explaining an example of steps of a content distribution process in the content display system according to the embodiment of the present invention.

Hereinafter, with reference to FIG. 8, an example of the steps of the content distribution process executed by the controller 11 of the management server 1 will be described.

In step S11, the controller 11 (content determination portion 112) determines the content to be distributed to the display device 2, on the basis of an instruction given by the manager, a request from the display device 2, and the like.

In step S12, the controller 11 (timetable management portion 113) creates the timetable T1 (FIG. 3) on the basis of the content determined by the content determination portion 112.

In step S13, the controller 11 (content distribution portion 114) transmits, to the display device 2, the content determined by the content determination portion 112, and the timetable T1 created by the timetable management portion 113. When the display device 2 receives the content and the timetable T1 from the management server 1, the display device 2 displays the content on the display portion in accordance with the timetable.

When the tinmetable T1 is changed in the display device 2 (S14: YES), the controller 11 (timetable management portion 113) receives the timetable T2 reflecting the change from the display device 2, and stores the timetable T2 in the storage 12 (updates the timetable) (S15).

Also, when a request for distribution of a content menu is received from the display device 2 (S16: YES), the controller 11 (content distribution portion 114) transmits the content menu to the display device 2 (S17).

Further, when a request for content distribution is received from the display device 2 (S18: YES), the controller 11 (content distribution portion 114) distributes content data corresponding to the content to the display device 2 (S19). The management sever 1 repeats the above process.

Content Reproduction Process

Figure 9:
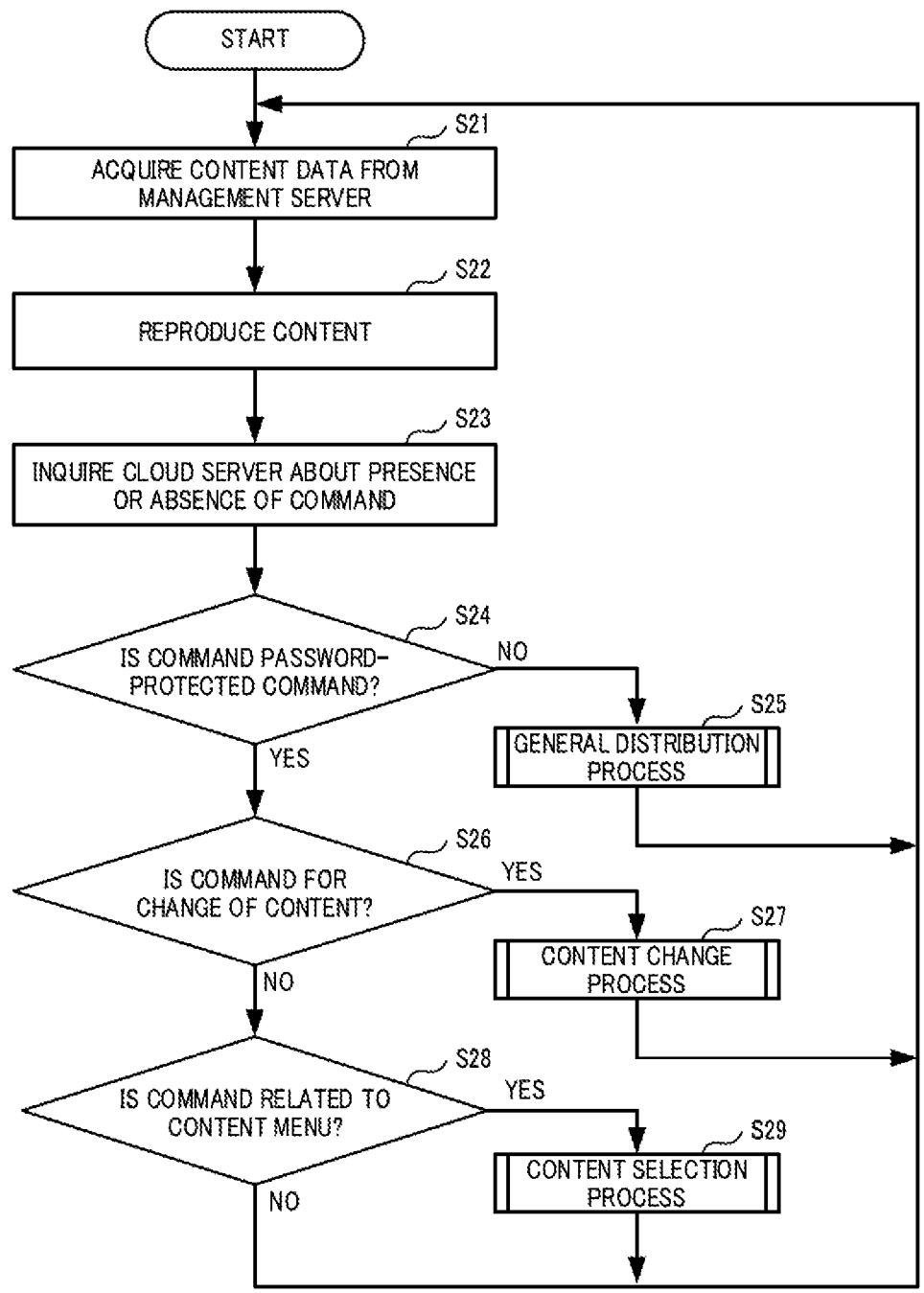
FIG. 9 is a flowchart for explaining an example of steps of a content reproduction process in the content display system according to the embodiment of the present invention.

Hereinafter, with reference to FIG. 9, an example of the steps of the content reproduction (display) process executed by the controller 21 of the display device 2 will be described.

In step S21, the controller 21 (content acquisition portion 212) acquires content data distributed from the management server 1, and the timetable T1 corresponding to the content data.

In step S22, the controller 21 (content reproduction portion 213) displays (reproduces) the content acquired by the content acquisition portion 212 on the display portion of the operation display portion 23 in accordance with the timetable T1.

In step S23, the controller 21 (command inquiry portion 214) transmits inquiry information inquiring whether the command is registered in the command information database DB1 (FIG. 4) in the cloud server 4 (polling processing).

In step S24, if a password is set on the command registered in the command information database DB1, in other words, if the command is a password-protected command (S24: YES), the process proceeds to step S26. If the command is not a password-protected command (S24: NO), the process proceeds to step S25. In step S25, a general distribution process (FIG. 10) described later is executed.

In step S26, when the command is a change command (S26: YES), the process proceeds to step S27, and a content change process described later (FIG. 11) is executed. If the command is not a change command (S26: NO), the process proceeds to step S28.

In step S28, when the command is a menu command (S28: YES), the process proceeds to step S29, and a content selection process described later (FIG. 12) is executed. The display device 2 repeats the above process.

General Distribution Process

Figure 10:
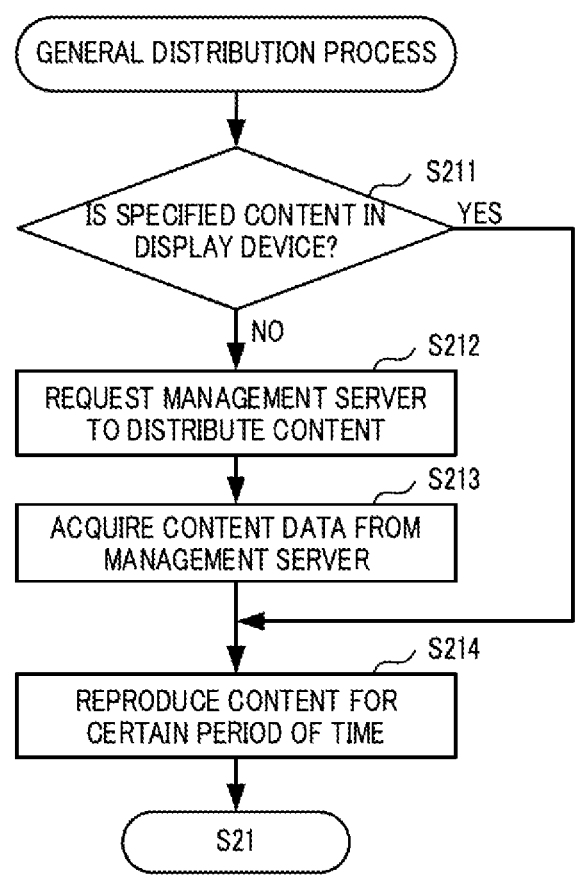
FIG. 10 is a flowchart for explaining an example of steps of a general distribution process in the content display system according to the embodiment of the present invention.

Hereinafter, with reference to FIG. 10, an example of the steps of a general distribution process executed by the controller 21 of the display device 2 will be described. The general distribution process is a process performed when content is displayed on the basis of an utterance of a viewer, who is a general user not having the authority to operate the display device 2. Here, it is assumed that a reproduction command for which a password is not set is registered in the command information database DB1.

In step S211, the controller 21 (content request portion 215) determines whether the display device 2 possesses (stores) the content corresponding to the reproduction command specified by the viewer. If the display device 2 does not possess the content (S211: NO), the process proceeds to step S212. If the display device 2 possesses the content (S211: YES), the process proceeds to step S214.

In step S212, the controller 21 (content request portion 215) requests the management server 1 to distribute the content. When the display device 2 possesses a part of the content, the controller 21 (content request portion 215) requests the management server 1 to distribute a lacking part of the content.

In step S213, the controller 21 (content acquisition portion 212) acquires the content data from the management server 1.

In step S214, the controller 21 (content reproduction portion 213) displays (reproduces) the acquired content on the display portion for a certain period of time. For example, when instructed to display content C by a viewer while content A is being displayed in accordance with the timetable T1, the controller 21 (content reproduction portion 213) suspends the display of content A and displays content C for a certain period of time. When the certain period of time ends, the controller 21 (content reproduction portion 213) displays content A again in accordance with the timetable T1.

Note that in the general distribution process, when the command registered in the command information database DB1 is a search command related to a desired keyword, the controller 21 (content reproduction portion 213) displays content representing a result of the keyword search on the display portion for a certain period of time.

Content Change Process

Figure 11:
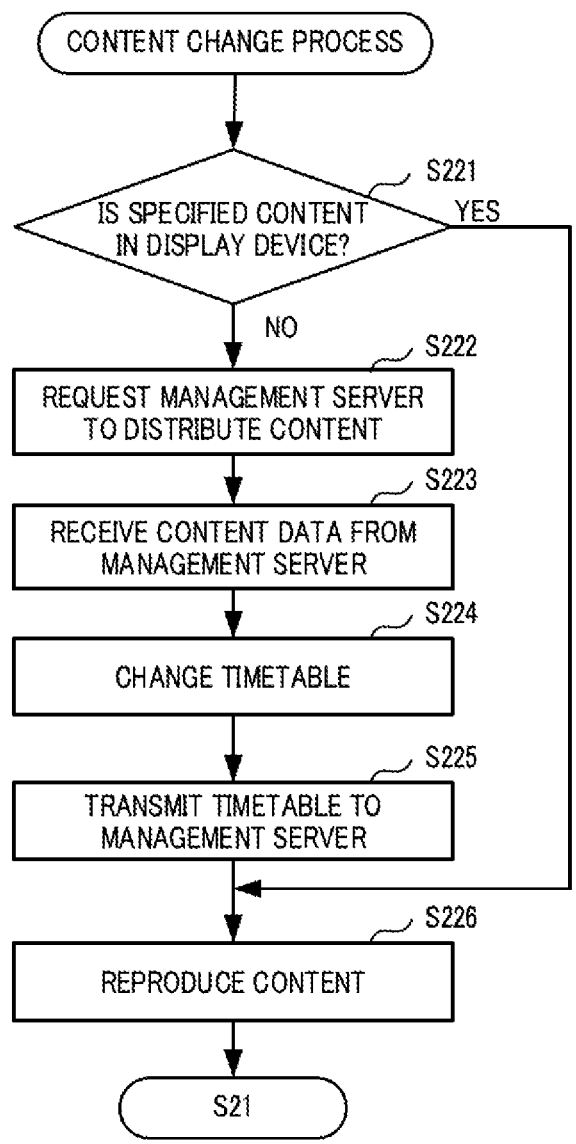
FIG. 11 is a flowchart for explaining an example of steps of a content change process in the content display system according to the embodiment of the present invention.

Hereinafter, with reference to FIG. 11, an example of the steps of a content change process executed by the controller 21 of the display device 2 will be described. The content change process is a process performed when content A (an example of first content of the present invention) being displayed is changed to content B (an example of second content of the present invention) on the basis of an utterance of an operator who is authorized to operate the display device 2. Here, it is assumed that a password-protected change command is registered in the command information database DB1.

In step S221, the controller 21 (content request portion 215) determines whether the display device 2 possesses content B corresponding to the change command specified by the operator. If the display device 2 does not possess content B in question (S221: NO), the process proceeds to step S222. If the display device 2 possesses content B in question (S221: YES), the process proceeds to step S226.

In step S222, the controller 21 (content request portion 215) requests the management server 1 to distribute content B. When the display device 2 possesses a part of content B, the controller 21 (content request portion 215) requests the management server 1 to distribute a lacking part of content B mentioned above.

In step S223, the controller 21 (content acquisition portion 212) acquires content data of content B from the management server 1.

In step S224, the controller 21 (timetable management portion 216) changes the timetable T1 (an example of a first timetable of the present invention) corresponding to content A to the timetable T2 (an example of a second timetable of the present invention) corresponding to content B. In step S225, the controller 21 (timetable management portion 216) transmits the timetable T2 reflecting the change to the management server 1.

In step S226, the controller 21 (content reproduction portion 213) displays (reproduces) the acquired content B on the display portion in accordance with the timetable T2 reflecting the change.

Content Selection Process

Figure 12:
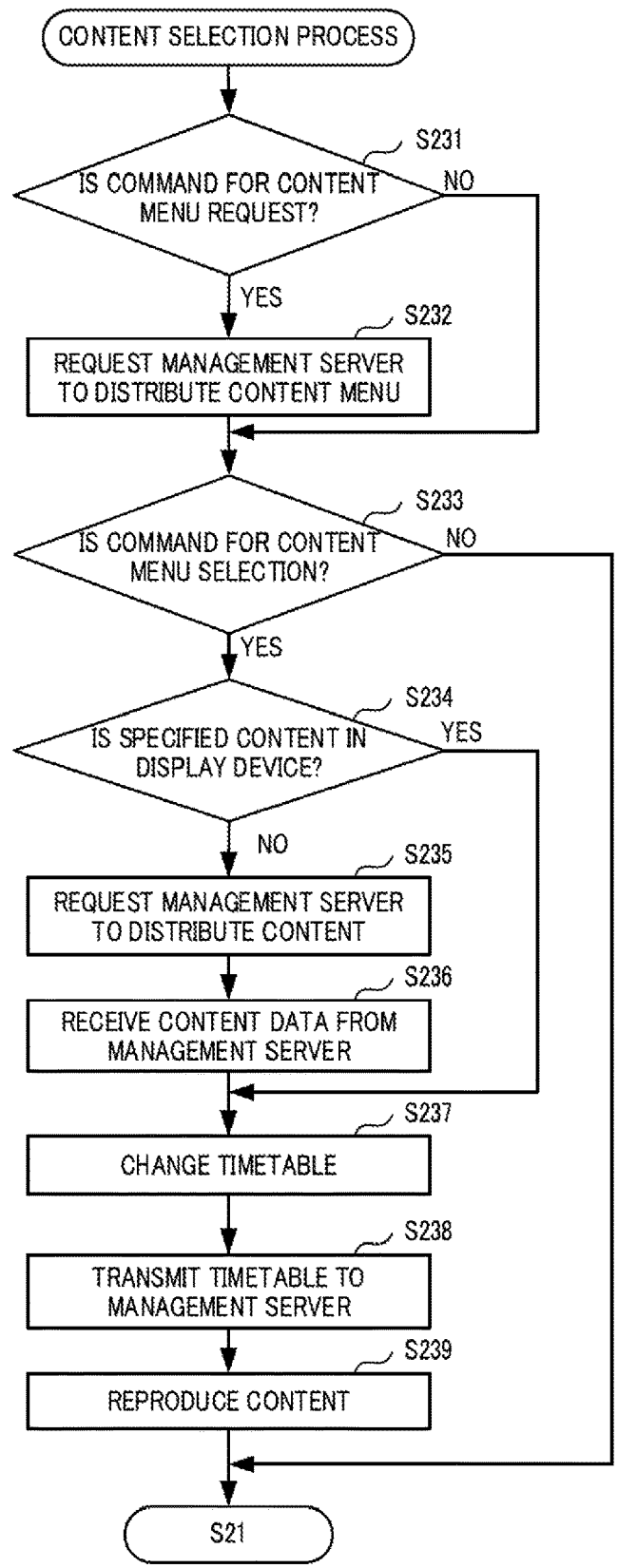
FIG. 12 is a flowchart for explaining an example of steps of a content selection process in the content display system according to the embodiment of the present invention.

Hereinafter, with reference to FIG. 12, an example of the steps of a content selection process executed by the controller 21 of the display device 2 will be described. The content selection process is a process performed when a menu of content is displayed on the basis of the utterance of the operator who is authorized to operate the display device 2, and the operator selects content from the menu. Here, it is assumed that a password-protected menu command is registered in the command information database DB1.

In step S231, if a command registered in the command information database DB1 is a menu command (S231: YES), the process proceeds to step S232. If the command is not a menu command (S231: NO), the process proceeds to step S233.

In step S232, the controller 21 (content request portion 215) requests the management server 1 to distribute the content menu. Here, if the operator gives an instruction orally to select content in the content menu displayed on the display device 2, a password-protected selection command is registered in the command information database DB1. Alternatively, the operator may specify desired content by speaking a number assigned to the content in the content menu.

In step S233, when the command registered in the command information database DB1 is the selection command (S233: YES), the process proceeds to step S234.

In step S234, the controller 21 (content request portion 215) determines whether the display device 2 possesses content corresponding to the selection command specified by the operator. If the display device 2 does not possess the content (S234: NO), the process proceeds to step S235. If the display device 2 possesses the content (S234: YES), the process proceeds to step S237.

In step S235, the controller 21 (content request portion 215) requests the management server 1 to distribute the content. When the display device 2 possesses a part of the content, the controller 21 (content request portion 215) requests the management server 1 to distribute a lacking part of the content.

In step S236, the controller 21 (content acquisition portion 212) acquires content data of the content from the management server 1.

In step S237, the controller 21 (timetable management portion 216) changes the timetable T1 on the basis of the content. In step S23$, the controller 21 (timetable management portion 216) transmits the timetable T2 reflecting the change to the management server 1.

In step S239, the controller 21 (content reproduction portion 213) displays (reproduces) the acquired content on the display portion in accordance with the timetable T2 reflecting the change.

The content is displayed by the processes described above. According to the content display system 100 of the embodiment of the present invention, desired content can be displayed or the content being displayed can be changed at a place (a display device) where the content is to be displayed. For example, it becomes possible, in a store or the like, to easily change the content by a person in charge of the site (operator) such as a clerk, who is familiar with the site environment such as a path of the user's movement and the actual sales situation of the store. In addition, since the clerk can select the content by the voice of the speech without needing special knowledge of a digital signage system or needing to perform the settings, etc., convenience of digital signage is improved. Further, since the content is distributed on the basis of the voice, people visiting the store (viewers) can also easily use the system. Furthermore, in the content display system 100, by linking the speaker device 3 with the digital signage system, flexible change of the content is enabled on site. Also, as the well-known learning function is provided in the content display system 100, more appropriate commands can be generated on the basis of the acquired voice. Consequently, useful information (content) desired by the user can be presented.

Here, the speaker device 3 is disposed in a public place and receives an unspecified large number of utterances. For this reason, there is a risk of unauthorized use by a malicious user instructing change or the like of the content illicitly. In the above respect, since the content display system 100 has a configuration of authenticating the user by setting a password on the command, unauthorized use as mentioned above can be prevented.

The content display system of the present invention is not limited to the configuration described above. For example, the content display system may be configured such that when the management server 1 holds identification information (1P addresses) for discrimination of the respective display devices 2, the management server 1 executes the polling processing on the cloud server 4, and when the management server 1 acquires a command, a process according to the command, for example, distribution of the content data or the content menu to the display device 2, is carried out.

In addition, each of the display devices 2 may be configured such that the speaker device 3 is incorporated therein. Further, the content display system 100 may be implemented by a single information processor including each of the above-described functions of the management server 1, the display device 2, the speaker device 3, and the cloud server 4.

Here, an example of a scene where the content display system 100 is used is presented. For example, when the user (operator) says "reproduce content", "product name" (television, for example), and a "password" to the speaker device 3, advertising content related to a television is displayed on the display device 2. The above "product name" is not limited to a specific product name, but may be coded number information, manufacturer information such as "S company product", or information on the product category such as "liquid crystal television". Further, the information to be displayed may be information linked with the current weather information such as "content to be displayed on a rainy day", or information related to a place of installation such as "content in front of an elevator in the Osaka store". Alternatively, the information to be displayed may be information indicating newly arrived content such as "What's New". Further, information linked with account data such as "content display mainly of unsold goods" may be adopted. Furthermore, the command may include "replacement" directing replacement of the current content, or "addition" directing addition of content.

In addition, the command may be a direction not relating to reproduction and change of the content, such as directions relating to volume control, brightness adjustment, etc., in the display device 2 and the speaker device 3.

What is claimed is:

1. A content display system comprising:
a first control device which displays content on a display;
a second control device which receives a voice;
a third control device which generates a command corresponding to the voice received by the second control device, and determines whether the generated command is a change command to change first content being displayed on the display; and
a fourth control device which distributes, to the first control device, second content corresponding to the change command when the third control device determines that the command is the change command, wherein
the first control device changes a material being displayed on the display from the first content to the second content distributed by the fourth control device,
when the voice received by the second control device includes authentication information to authenticate a user, the third control device adds the authentication information to the change command generated corresponding to the voice, and
when the authentication information is not added to the change command, the first control device suspends display of the first content, displays the second content for a certain period of time, and displays the first content again in accordance with the first timetable when the certain period of time ends.

2. The content display system according to claim 1, further comprising storage in which the command generated by the third control device is registered, wherein
the first control device transmits, to the third control device, inquiry information inquiring whether the command is registered in the storage, and
the third control device determines whether the command registered in the storage is the change command, on the basis of a result of inquiry from the first control device.

3. The content display system according to claim 2, wherein
the first control device requests the fourth control device to distribute the second content when the command registered in the storage is the change command, and
the fourth control device distributes the second content to the first control device when the request is received from the first control device.

4. The content display system according to claim 1, wherein
the fourth control device creates a timetable to manage a content reproduction schedule on the basis of the content, and transmits the created timetable to the first control device, and
when acquiring the second content from the fourth control device, the first control device changes a first timetable for reproduction of the first content to a second timetable for reproduction of the second content, and displays the second content on the display in accordance with the second timetable.

5. The content display system according to claim 1, further comprising:
a display device including the first control device;
a speaker device including the second control device;
a cloud server including the third control device; and
a management server including the fourth control device,
wherein the display device, the speaker device, the cloud server, and the management server are connected to each another via a network.

* * * * *